Oct. 23, 1951 H. L. HORWITZ 2,572,027

RELAY SET-SUBSCRIBER'S LOCKOUT CIRCUIT

Filed Nov. 30, 1946 2 SHEETS—SHEET 1

INVENTOR
HENRY L. HORWITZ
BY Robert Harding Jr.
ATTORNEY

Oct. 23, 1951 H. L. HORWITZ 2,572,027

RELAY SET-SUBSCRIBER'S LOCKOUT CIRCUIT

Filed Nov. 30, 1946 2 SHEETS—SHEET 2

INVENTOR
HENRY L. HORWITZ
BY Robert Harding Jr.
ATTORNEY

Patented Oct. 23, 1951

2,572,027

UNITED STATES PATENT OFFICE 2,572,027

RELAY SET-SUBSCRIBER'S LOCKOUT CIRCUIT

Henry L. Horwitz, Jamaica, N. Y., assignor to Federal Telephone and Radio Corporation, New York, N. Y., a corporation of Delaware Application November 30, 1946, Serial No. 713,353

7 Claims. (Cl. 179—18)

This invention relates to new and useful improvements in telephone line lock-out arrangements.

The object of the present invention is to provide a circuit arrangement including a set of relays automatically to disconnect a telephone subscriber's line from its associated line circuit, whenever the line becomes short-circuited or the subscriber removes the handset and fails to dial within a predetermined interval of time. When the line is restored to its normal condition, it is automatically re-connected to the line circuit.

In comparison with existing lock-out schemes, the present circuit has an advantage in that no changes in equipment are required in the central exchange equipment. The set of relays is mounted on a separate rack, permitting lock-out service to be provided for any line in the exchange without affecting the subscriber's directory number.

The nature of the invention will be more fully explained in the attached drawings in which.

These drawings show only the pertinent parts of a telephone exchange.

Figure 1:
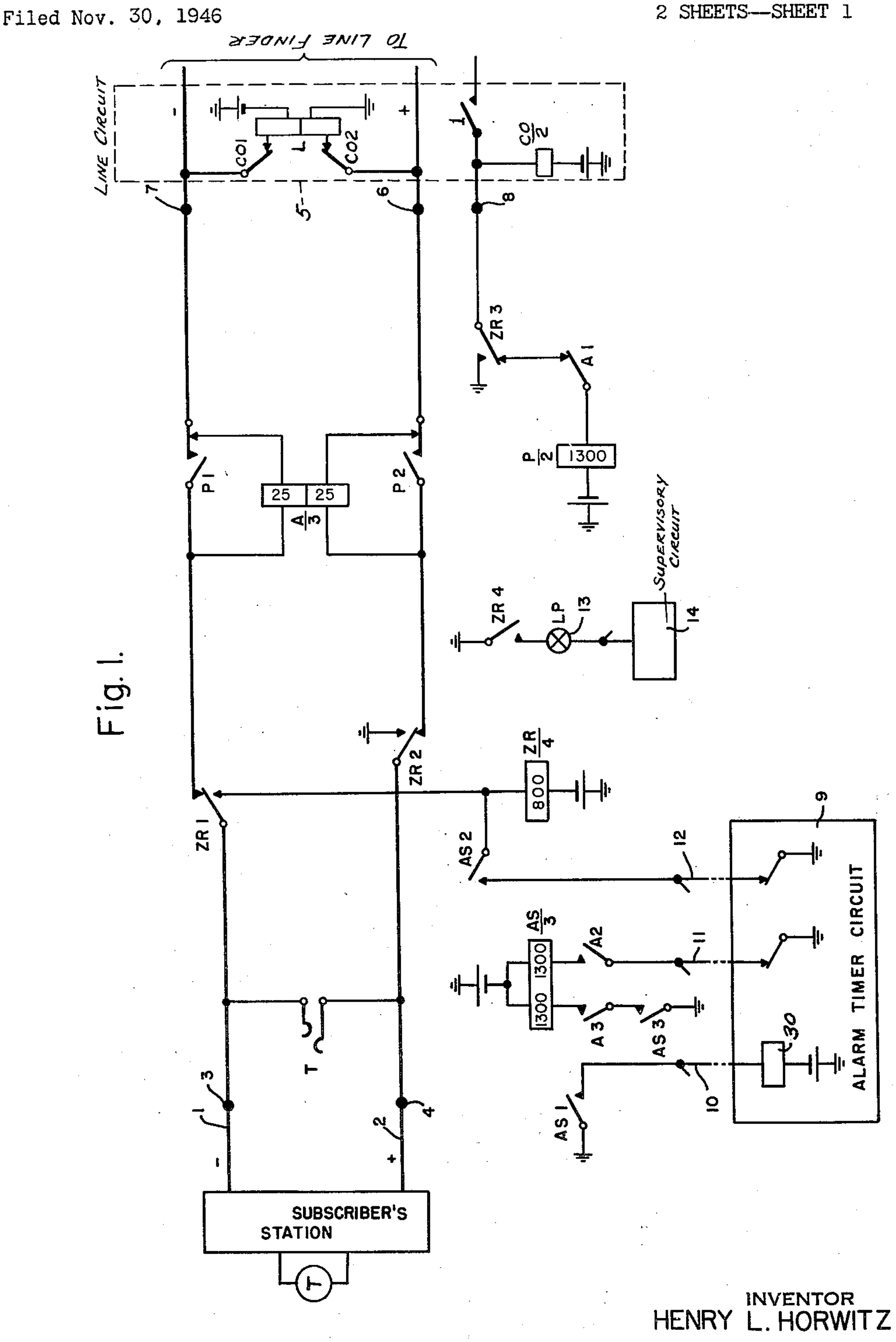
Fig. 1 shows a lock-out relay circuit with master timing control.

In the first embodiment shown in Fig. 1, a subscriber's line 1, 2 is disconnected from the line circuit 5 at the main distributing frame (not shown) and connected to the "in" terminals 3 and 4 of the relay set. The "out" terminals of talking and test conductors 6, 7, 8 are connected to the regular subscriber's line circuit. The line circuit may be of conventional design well known to persons skilled in the art and is shown in the drawing as comprising the conventional line relay L having one winding connected between the negative terminal of a battery and line 7 through line contact CO1 and having another winding connected between ground and line 6 through line contact CO2. The conventional cut-out relay CO is shown as being connected between test line 8 and the negative terminal of a battery. Test line 8 is connected to the test line coming from the line finder by a normally open contact 1. A common alarm timer circuit 9, customarily provided for other purposes in the exchange, is connected to the relay set over leads 10, 11, 12. The lead 11 is grounded only when the timer 30 is available, that is, in its stand-by position. When any relay set like Fig. 1 which is multipled to leads 10, 11, 12 grounds the lead 10, the timer 30 begins to operate. When the predetermined time has elapsed, a ground potential is transmitted over the lead 12. When at any time the ground is removed by the relay set from the lead 10, the alarm timer 30 immediately returns to its home position.

When the subscriber originates a call, a circuit is completed from the subscriber's station over the subscriber's loop 1, 2, $ZR_1$, $ZR_2$ back, the windings of relay A of the relay set, $P_1$, $P_2$ back, conductors 6, 7 to ground through normally closed contact CO2 and one winding of line relay L and through normally closed contact CO1 and the other winding of the line relay to a battery. Relay A operates. Contact $A_1$ disconnects relay P from the wire 8. Contact $A_2$ prepares a circuit from wire 11 to relay AS. Contact $A_3$ prepares a holding circuit for relay AS.

When the line 1, 2 is connected through the line circuit 5 to the first group selector (not shown) in the usual manner, as disclosed, for example, in U. S. Patent No. 1,862,536 issued to Hartley et al. on June 14, 1932, the wire 8 is grounded by the operation of the line relay L to close contact 1, which, at this moment, has no effect on the relay set. Ground is maintained on wire 8 from the selectors (not shown) in the well known manner while the line 1, 2 is bridged, since wire 8 is connected to the private or test wire of the automatic switches in the line circuit 5. This constitutes a holding circuit for the lock-out relays under control of the talking conductors and the subscriber's station. The subscriber receives the dial tone, and relay A releases when the first impulse is dialed. In releasing, contact $A_1$ completes the circuit from the grounded wire 8 to relay P, which then operates and is held operated until the end of the conversation when the bridge at the subscriber's station is removed from line 1, 2. Contact $A_2$ (released) disconnects relay AS from wire 11. Contacts $P_1$ and $P_2$ (both operated) disconnect relay A and connect the subscriber's loop 1, 2 directly to the line circuit 5. The back contacts of $P_1$, $P_2$ being held open, the dialing impulses cannot re-operate relay A which stays disconnected during the whole conversation. At the end of the conversation the ground connection is removed from the wire 8 and relay P restores.

If the subscriber does not dial or the subscriber's line is continuously short-circuited, then relay A operates as above described. Since relay A does not release, relay P remains unoperated. When the alarm timer 9 is available, the grounded wire 11 is connected over contact $A_2$ to the operating winding of relay AS which operates and holds over contact $AS_3$ and contact $A_3$ (operated). Contact $AS_1$ grounds the lead 10 which operates the alarm timer 30. Contact $AS_2$ (operated) prepares the circuit of relay ZR.

When the predetermined time has elapsed, the alarm timer connects ground to the wire 12, operating relay ZR. Contacts $ZR_1$ and $ZR_2$ disconnect the loop 1, 2 from circuit 5 and the selectors, and connects ground and relay ZR to the calling subscriber's loop 1, 2, holding relay ZR in the operated position. Contact $ZR_3$ disconnects relay P from the wire 8 and grounds the latter. The grounded wire 8 prevents any call from reaching the locked-out subscriber's line 1, 2. Contact $ZR_4$ connects a supervisory lamp 13 in the relay set and operates a common supervisory circuit 14.

Relay A releases when P becomes energized and disconnects relay AS. Contact $AS_1$ (released) removes ground from the alarm timer lead 10 which returns to its home position.

When the subscriber replaces his receiver or the short circuit is eliminated, relay ZR releases and reconnects the subscriber's line 1, 2 to the subscriber's line circuit 5 through contacts $ZR_1$ and $ZR_2$ back.

When the line 1, 2 is called, ground will be applied to the test wire 8 from the calling connector. Relay P operates, disconnects relay A and thus removes the lock-out circuit from the line.

The calling subscriber is now connected to the called subscriber over $P_1$, $P_2$ front and $ZR_1$, $ZR_2$ back without any attachment to the line.

Figure 2:
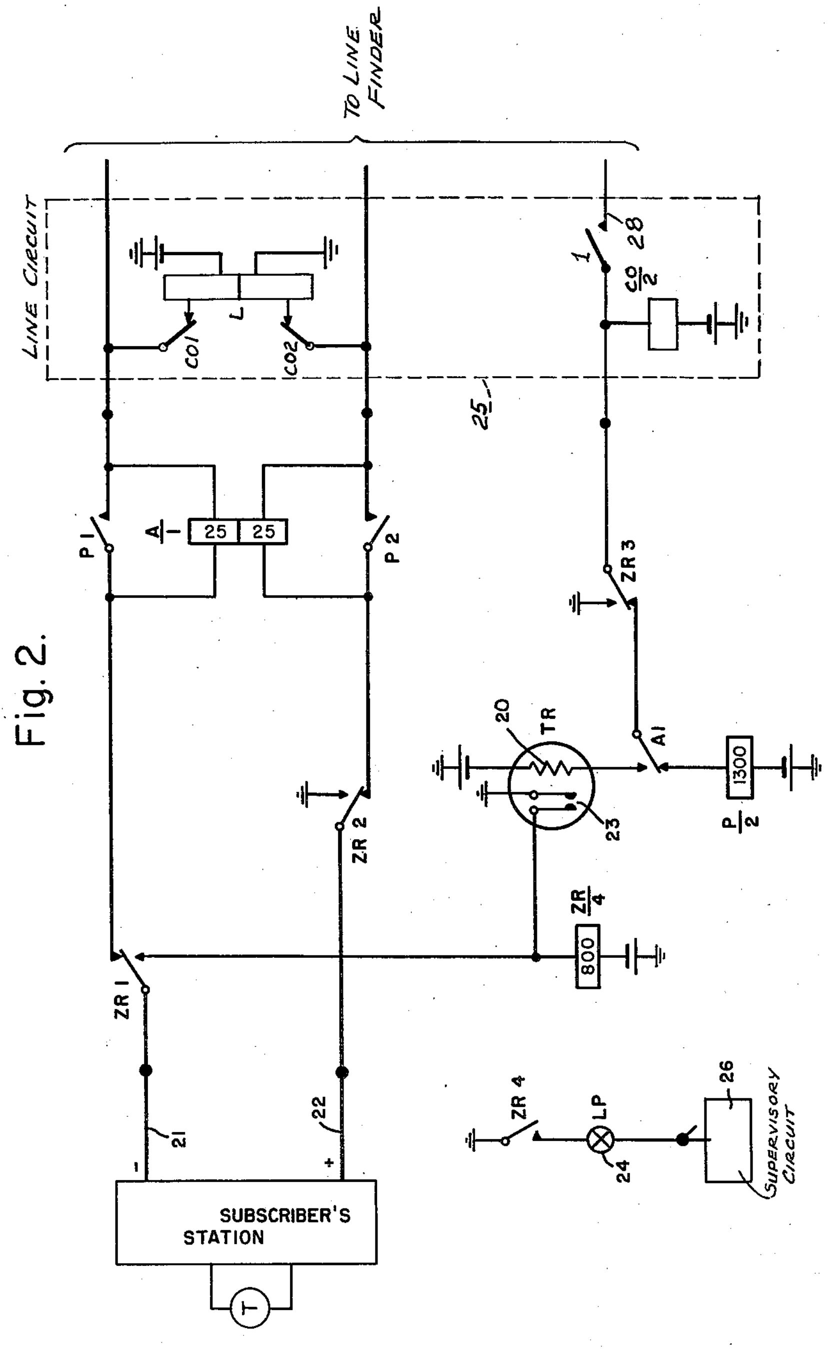
Fig. 2 shows a lock-out relay circuit having a thermostatic timer.

In the embodiment of Fig. 2, the line 21, 22 is, as in the case of Fig. 1, disconnected at the main distributing frame and connected with its line circuit 25 over the relay set. This set contains the A, P and ZR relays of Fig. 1, but not the AS relays and the connection with the alarm timer circuit.

When the subscriber originates a call, a circuit is completed over the subscriber's loop 21, 22, $ZR_1$, $ZR_2$ back, the windings of relay A to ground and battery in the line circuit 25. Relay A operates. The contact of relay A disconnects relay P from the test wire 28 and prepares a circuit from the latter to the heating winding 20 of a thermostatic relay TR. When the subscriber is connected through to the first group selector, the test wire 28 is grounded, completing the circuit to the heating winding 20 of the thermostatic relay. At this moment, the contacts 23 of the thermostatic relay do not yet operate.

The subscriber receives the dial tone, and relay A releases at the first dial impulse. In releasing, the contact of relay A completes the circuit from the grounded test wire to relay P, which then operates and is held operated until the end of the conversation when the bridge at the subscriber's station is removed from line 21, 22. Contacts $P_1$ and $P_2$ (both operated) short circuit relay A, and connect the subscriber's loop 21, 22 directly to the subscriber's line circuit 25. At the following impulses, relay A does not re-operate, because both of its windings are short circuited by contacts $P_1$ and $P_2$ which remain operated during the whole conversation. At the end of the conversation, the ground connection is removed from the test wire 28 and relay P will restore. Ground is maintained on wire 28 from the selectors (not shown) in the well known manner while the line 21, 22 is bridged, since wire 28 is connected to the private or test wire of the automatic switches in the line circuit 25. This constitutes a holding circuit for the lock-out relays under control of the talking conductors and the subscriber's station.

If the subscriber does not dial or the line 21, 22 is continuously short-circuited, then relay A operates as before. Since, however, relay A does not release, relay P remains unoperated, and the heating winding 20 remains under current. After a predetermined time for which the thermostatic relay TR is adjusted, the contacts 23 will close, completing a circuit to relay ZR which operates. Contacts $ZR_1$ and $ZR_2$ disconnect the loop 21, 22 from the switch-train and connect ground and relay ZR to the calling subscriber's loop, holding the relay in the operated position. Contact $ZR_3$ disconnects relay P from the test wire and grounds the latter. The grounded wire 28 prevents any other subscriber from reaching the locked-out subscriber. Contact $ZR_4$ connects a supervisory lamp 24 of the relay set with a common supervisory circuit 26. Relay A restores.

When the subscriber replaces his receiver, or the short circuit is eliminated, and when the subscriber is called by any other subscriber, the relay set operates as described in connection with Fig. 1.

What I claim is:

1. In a telephone exchange system, a plurality of subscriber's stations, subscriber talking conductors connected to each of said subscriber stations, talking and test conductors terminating in a line circuit at said exchange and a relay lock-out set for each station operatively connected to said line talking conductors, comprising, a first relay a plurality of contacts having operated and rest positions, said contacts being controlled by said relay, means for operating said relay in response to bridging of the talking conductors at said subscriber's station, a second relay, an operating circuit for controlling said second relay including the test conductor of said subscriber's station and a rest contact of said first relay, means for releasing said first relay in response to a dial impulse from said subscriber's station and for operating said second relay through said rest contact and said test conductor, a timing circuit controlled by operated contacts of said first relay, a third relay, normally closed contacts operable by said last named relay interconnecting said subscriber talking conductors and said talking conductors connected to the line circuit, circuit means including said timing circuit for operating said third relay a predetermined period of time after operation of said first relay to open said normally closed contacts thereby disconnecting the subscriber talking wires from the line talking wires, and a holding circuit for said third relay established upon operation of said third relay when a short circuit condition exists across the subscriber talking wires by said normally closed contacts in operated condition comprising said subscriber talking wires and said short circuit.

2. The system as claimed in claim 1 and further comprising an alarm circuit controlled by said third relay.

3. The system as claimed in claim 1 and further comprising circuit means controlled by said third relay for applying a busy signal to said test conductor.

4. The system as claimed in claim 1 in which said first relay has two windings connected in series in respective of said talking conductors connected to said line circuit and said contacts of said second relay are adapted to short-circuit said windings upon operation of said second relay.

5. The system as claimed in claim 1 wherein said timing circuit is connected common to a plurality of relay lockout sets.

6. The system as claimed in claim 1 wherein said timing circuit includes a thermostatic relay having contacts controlling said operating circuit of said third relay.

7. The system as claimed in claim 1 wherein said timing circuit includes an alarm timer connected common to a plurality of subscriber's stations and further comprising a fourth relay connected in said relay set being energized under the joint control of said timer and said first relay, said timer and said fourth relay having contacts in the operating circuit of said third relay.

HENRY L. HORWITZ.

REFERENCES CITED

The following references are of record in the file of this patent:

UNITED STATES PATENTS

| Number | Name | Date |
|---|---|---|
| 1,200,841 | Ide | Oct. 10, 1916 |
| 1,610,346 | Willis | Dec. 14, 1926 |
| 1,671,791 | Stehlik | May 29, 1928 |
| 1,738,564 | Christian | Dec. 10, 1929 |
| 1,759,267 | Merk | May 20, 1930 |
| 1,871,300 | Burgener | Aug. 9, 1932 |
| 1,941,085 | Hague | Dec. 26, 1933 |